(No Model.)  G. M. BRILL.  2 Sheets—Sheet 1.
CAR BRAKE.
No. 445,307.  Patented Jan. 27, 1891.
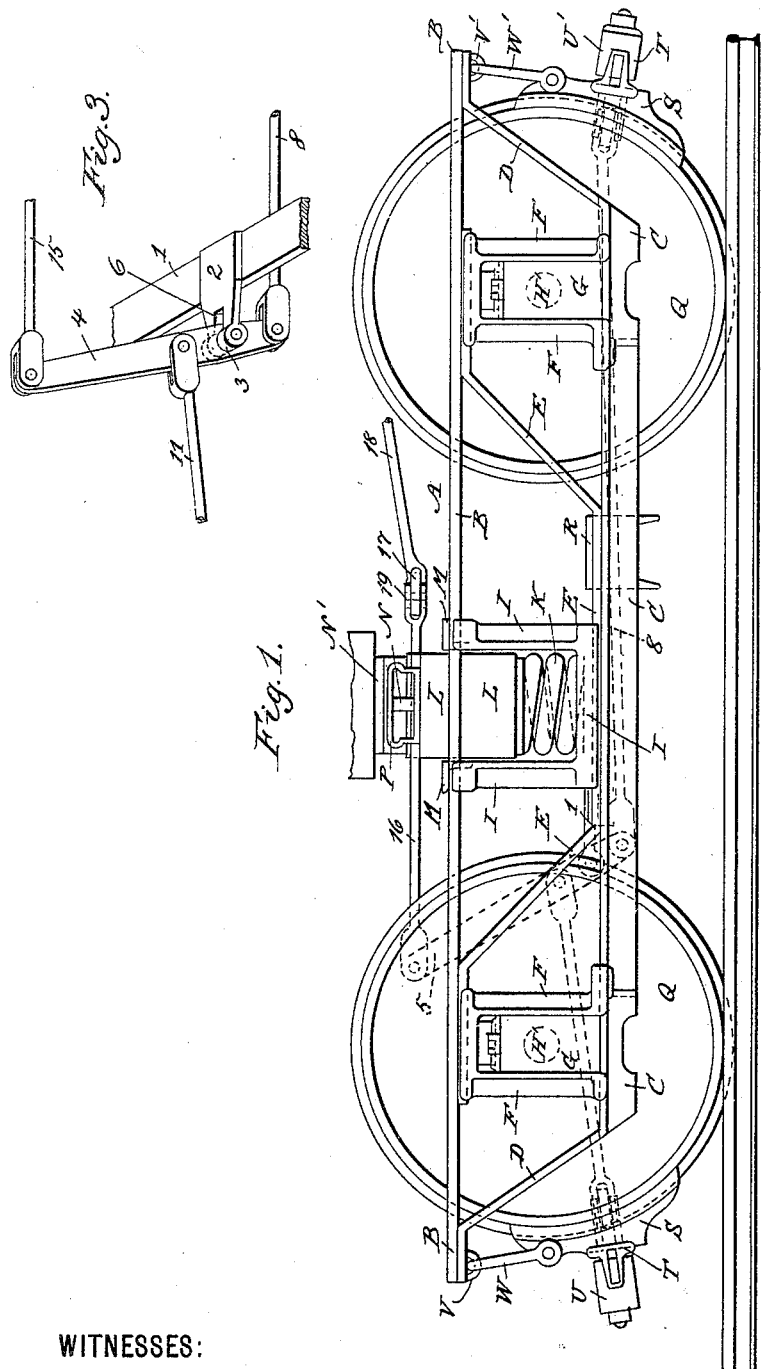
WITNESSES:
D. C. Reusch.
Herbert F. Dunbar.
INVENTOR
George Martin Brill
BY
Joseph G. Levy
ATTORNEY

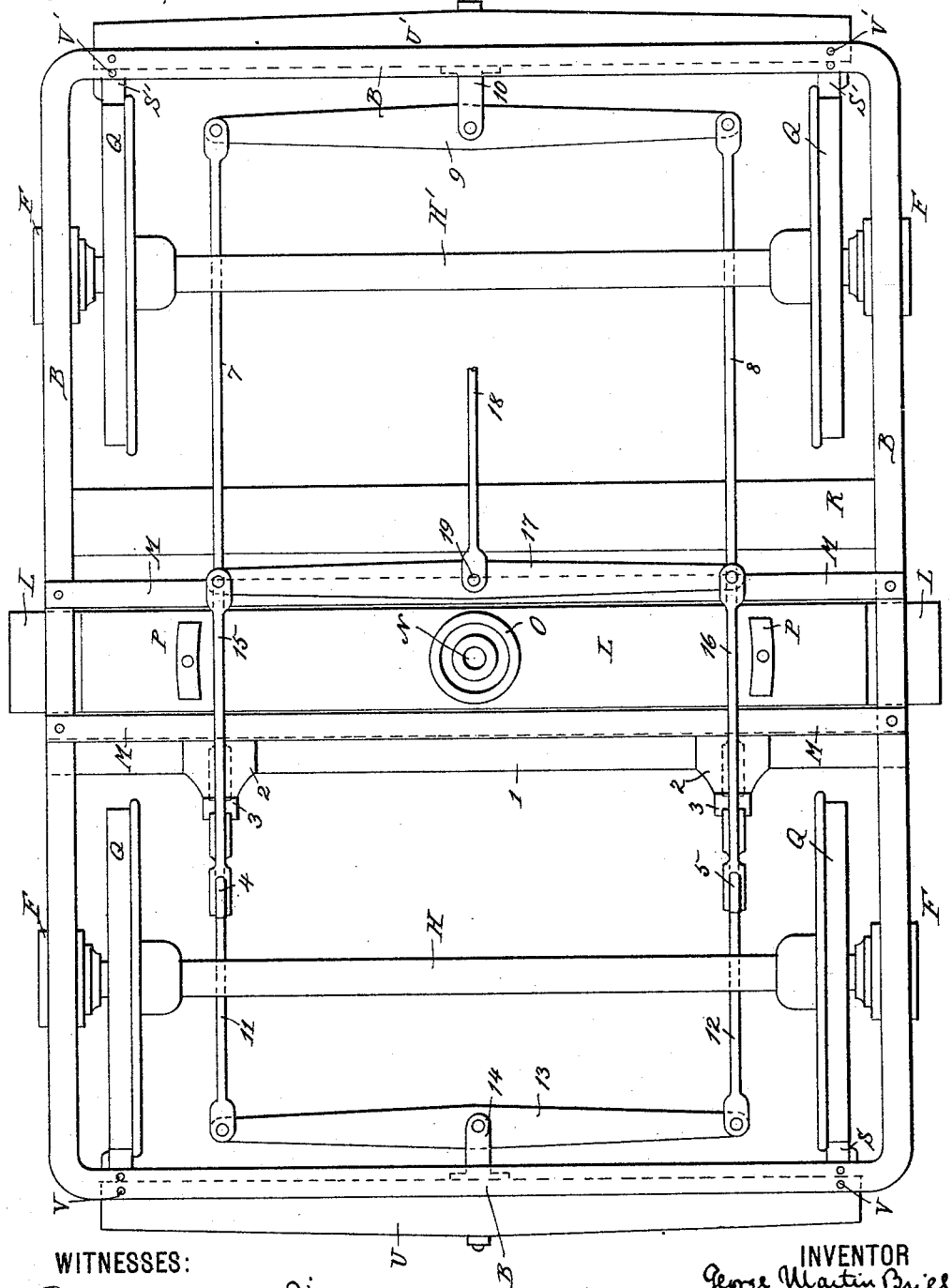

UNITED STATES PATENT OFFICE.

GEORGE MARTIN BRILL, OF PHILADELPHIA, PENNSYLVANIA.

CAR-BRAKE.

SPECIFICATION forming part of Letters Patent No. 445,307, dated January 27, 1891.

Application filed September 30, 1890. Serial No. 366,700. (No model.)

*To all whom it may concern:*

Be it known that I, GEORGE MARTIN BRILL, a citizen of the United States, residing at Philadelphia, county of Philadelphia, and State of Pennsylvania, have invented a new and useful Car-Truck and Equalizing-Brake, of which the following is a specification.

My invention has for its object the accomplishment of several very desirable objects. In mounting brake mechanisms upon car-trucks, especially those upon which electric motors or cable-grips are used, great difficulty has been encountered in locating the motor, &c., in such a manner that the brake mechanism can work clear of it and at the same time have a line of draft always along the central line of the truck. This has been successfully accomplished in my present invention by supporting from the truck-brake connections near the pivotal point of the truck a floating brake-lever, and to this by means of an inflexible connection is pivotally secured the brake-lever coming from the car-body. The point of the application of the power to operate the brake being located very close to the pivotal point of the truck permits the car body and truck to vibrate on a horizontal plane or pivot without lengthening or shortening the truck-brake rods. The importance of this is very apparent. The connection between the car-brake lever and the truck-brake levers in trucks of this kind is usually an inflexible one, as distinguished from one that is flexible, as it is extremely important that the brakes should be applied very quickly, and this an inflexible connection will do, whereas one that is flexible, as a chain or chain and rod combined, necessitates the expenditure of too much time for applying the brakes. The use of the inflexible connection in combination with the floating lever or other like device permits the point of union of the inflexible connection and the floating lever to be made immediately at or very near the swiveling-point of the truck, thereby causing a minimum of vibration of the connection.

The brake system in its entirety consists of three distinct and separate elements—to wit, a brake-lever located on the car-body, a system of brake levers, rods, and shoes mounted upon the truck, and brake-levers and brake-rods located between the truck and car-brake lever. This last I term the "intermediate brake system" to distinguish it from the others.

The brake-shoes and brake-beams are hung from the upper chord of the truck, and there being very little motion of the pedestals, in this case due to the nature of the construction of the truck, the brake-shoes have but very little motion, and their point of application to the tread of the wheel remains almost constantly in the same place.

In this application I have incorporated a novel feature in truck construction, which I have described and claimed in an application filed by me June 19, 1890, Serial No. 355,951. This feature consists in locating the pivotal point of the truck, or, in structural phraseology, the "king-bolt," and truck and body-bolster to one side of a line drawn semi-distant between the centers of the axles, and this feature I intend herein to claim in combination with the novel features of the brake mechanism.

The construction wherein my invention resides and by means of which I am enabled to obtain the object above described will be more fully set forth in the following description and the claims.

Reference is to be had to the accompanying drawings, forming part of the specification, in which similar letters and figures have reference to corresponding parts in all the views.

Figure 1 is a side elevation of a four-wheeled truck embodying my invention, a portion of the brake mechanism being shown in dotted lines. Fig. 2 is a plan view of the same. Fig. 3 is a perspective view of a detailed portion of the brake rods and levers.

The general construction of the truck shown in the drawings forms no part of my present invention, it being substantially the same as that shown and described in my application before referred to, so that I shall but briefly describe it here.

In the drawings, A is the truck-frame, composed of the members B, C, D, and E. The member B is the upper chord of the frame. Supported within the truck-frame and between its members are the axle-box saddles F, carrying axle-boxes G, in which are the truck-axles H H'.

At I is shown the transom. Springs K, of the usual form, are supported within the transom, and which are connected at their upper ends to a bolster L, said bolster being permitted to rise and fall freely, and being held in position by the guides M, stretched across the truck-frame and secured to the upper chord B thereof.

At N is shown the king-bolt located in the center plate O, which center plate and king-bolt are securely affixed to the bolster L in any suitable manner.

At N' is shown the body-bolster, and at P the truck-side bearings, which are securely fastened to the bolster L.

Q Q are the truck-wheels, and R a transverse channel-beam supported upon the truck-frame for carrying a motor or grip mechanism which it is proposed to locate there.

The foregoing description of the parts of the truck-frame and details is only made to show a well-organized and operative device, and such parts may be altered or changed to suit any particular requirements, the novel feature being the location of the king-bolt, as before described.

Having thus described a particular form of truck upon which my brake mechanism may be used, I shall proceed to describe that in detail.

By reference to Fig. 1 it will be seen that the brake-shoes S S' are securely fastened, as at T T', to the brake-beams U U'. The brake-shoes being secured to the brake-beams, preferably without any play or motion upon each other, and the brake-shoes being supported from the truck-frame, the brake-beams are therefore supported through the brake-shoes to the truck-frame. This is accomplished by securing to the under side of the upper chord B of the truck-frame strap-bolts V V'. From these strap-bolts pivotally depend links W W', which at their lower ends are pivotally secured to the brake-shoes.

At 1, Fig. 2, is a bar extending transversely across the truck and supported from the lower chord C of the same, and by which the upright truck-brake rods are supported. Secured to this bar are two outwardly-extending projections 2, Figs. 2 and 3, having bearings 3 for the reception of the upright truck-brake levers 4 5. The bearing end of the projection 2 is bifurcated, as shown at 6, Fig. 3, so that the upright truck-brake levers can be placed within the projection and be fulcrumed therein. The truck-brake levers 4 and 5 occupy normally a position at an angle to the vertical, and are provided with holes at their lower ends located at a suitable distance from the fulcral-point for the reception of the truck-brake rods 7 8, which lead to what in this case is termed the "front end" of the truck, or to the right, where they are secured to the transverse equalizing-lever 9, which is secured to the brake-beam U' by means of the jaw-bolt 10. All the connections of the foregoing rods and levers are pivotal. At a suitable distance above the fulcral-point of the upright truck-brake levers 4 5 another series of holes are provided for the reception of the rearwardly-extending truck-brake rods 11 and 12, which in their turn engage with the transverse equalizing-lever 13, and which is secured to the brake-beam U by means of the jaw-bolt 14. These connections are also pivotal.

The forward and rearwardly extending truck-brake rods are pivotally secured to the upright truck-brake levers at any distance from the fulcral point of the same, which will impart sufficient oscillation to the brake-beams to bring the brakes in contact with the wheels. This is a matter of adjustment.

The foregoing description of brake rods, levers, &c., refers to those that are directly supported upon the truck-frame, and are so named to distinguish from those that are located between the car-body and the truck and not directly supported thereby. The car-body is provided with a brake-lever the end of which may depend below the flooring, (not shown,) and as has hitherto been done the truck-brake rods and levers have been directly connected thereto either by a chain or inflexible rod. When an inflexible connection is used between the car and intermediate brake mechanism, the movement of the car in relation to the truck while rounding curves causes the brake-rods to lengthen and shorten, rendering the brake inefficient and slow in action. This lengthening and shortening of the rods prevents the line of draft (that is the direction of the pull of the brake-rods) being constantly in the longitudinal axis of the truck.

If a flexible connection is used, it necessarily requires a comparatively longer time to apply the brakes, together with other disadvantageous features. It is the saving of time in the application of the brakes that calls for the use of an inflexible rod, and such I have shown in my present device. However, a flexible connection could be used; but it is not considered desirable. Now the most essential and important feature of my invention lies in intercepting the connection between the car and truck brake levers, &c., and locating between them what I term a "floating lever," which is connected by suitable means to the upright truck-brake levers and to the car-brake lever. The line of draft is thereby always in the same direction—to wit, following the longitudinal axis of the truck—which does away with the objectionable feature of the brake-rods lengthening or shortening on rounding curves, and the point of connection between the truck-brake lever and the car-brake lever can be made nearer the pivotal or swiveling point of the truck, thus giving a minimum of horizontal vibration to the rod connecting the car and truck-brake levers.

The foregoing is accomplished by the following mechanism, which I term the "intermediate brake system." Leading (in this case to the front end of the truck) from the truck-brake levers 4 and 5 are levers 15 and 16, which engage with the floating lever 17. The floating lever 17 is directly connected with the brake-lever on the car-body by the inflexible connection or rod 18. All these connections are pivotal. It will be seen that the levers 15, 16, and 17 are not supported from the truck, they forming, as it were, a system of levers intermediate of the truck and car levers. By shortening the levers 15 and 16 or by making any other suitable change the floating lever or the point 19 could be placed nearer the pivotal point of the truck.

Although I have shown my brake system as being mounted upon a truck having the swiveling-point arranged as shown and described, I do not confine myself to such a combination, as its use need not be so restricted. It is also obvious that the equalizing-brake system can be used upon a truck that does not swivel in relation to the car-body.

Having thus described my invention, what I claim, and desire to secure by Letters Patent, is—

1. A car-truck having a bolster, in combination with a connected equalizing-lever, brake-beam, and upright brake-levers supported on the truck entirely at one side of the bolster, an equalizing-lever and brake-beam connected with the brake-levers and located at the other side of the bolster, and means for operating the upright brake-levers, substantially as described.

2. A car-truck having a bolster, in combination with an equalizing-lever, brake-beam, and upright brake-levers, all connected together, the brake-levers being supported on the truck entirely at one side of the bolster, an equalizing-lever and brake-beam connected with brake-levers and located at the other side of the bolster, a floating lever and rods connected to the upright brake-levers, and means for operating the floating lever, substantially as described.

3. In an equalizing car-brake, the combination of the equalizing-levers connected with the brake-beams and the upright brake-levers mounted on a transverse beam of the truck entirely at one side of the pivotal point of the truck, the said equalizing-levers and upright brake-levers being operatively connected, substantially as described.

4. In an equalizing car-brake, the combination of the equalizing-levers connected with the brake-beams and the upright brake-levers mounted on a transverse beam of the truck entirely at one side of the pivotal point of the truck, said pivotal point being located to one side of a line drawn semi-distant between the truck-axles, substantially as described.

5. In an equalizing car-brake, the combination of the equalizing-levers connected with the brake-beams, upright brake-levers mounted on a transverse beam of the truck entirely on one side of the pivotal center of the truck, the said equalizing-levers and upright brake-rods being operatively connected, and a floating lever and rods connected to the upright brake-levers, as set forth.

6. In an equalizing-brake, the combination, with the inflexible rod 18 and means for operating it and a brake system supported upon a truck-frame and having levers 4 and 5, of the floating lever 17, suspended transversely of the truck and secured to the rod 18, and rods 15 and 16, secured at one end to the lever 17 and to the said levers 4 and 5 at the other, substantially as described.

Signed at Philadelphia, county of Philadelphia, State of Pennsylvania, this 24th day of September, 1890.

GEO. MARTIN BRILL.

Witnesses:
THEO. H. MCCALLA,
GEO. GLAZIER.